United States Patent
Chen et al.

(10) Patent No.: US 9,829,059 B2
(45) Date of Patent: Nov. 28, 2017

(54) SINGLE DEGREE-OF-FREEDOM MAGNETIC VIBRATION ISOLATION DEVICE

(71) Applicant: HUAZHONG UNIVERSITY OF SCIENCE AND TECHNOLOGY, Wuhan, Hubei (CN)

(72) Inventors: Xuedong Chen, Hubei (CN); Zilong Li, Hubei (CN)

(73) Assignee: Huazhong University of Science and Technology, Wuhan, Hubei (CN)

( * ) Notice: Subject to any disclaimer, the term of this patent is extended or adjusted under 35 U.S.C. 154(b) by 0 days.

(21) Appl. No.: 15/118,776

(22) PCT Filed: Jun. 20, 2014

(86) PCT No.: PCT/CN2014/080357
§ 371 (c)(1),
(2) Date: Aug. 12, 2016

(87) PCT Pub. No.: WO2015/120683
PCT Pub. Date: Aug. 20, 2015

(65) Prior Publication Data
US 2017/0045107 A1   Feb. 16, 2017

(30) Foreign Application Priority Data
Feb. 14, 2014 (CN) .......................... 2014 1 0051123

(51) Int. Cl.
*F16F 6/00* (2006.01)

(52) U.S. Cl.
CPC ................ *F16F 6/005* (2013.01); *F16F 6/00* (2013.01); *F16F 2222/06* (2013.01); *F16F 2228/063* (2013.01); *F16F 2232/08* (2013.01)

(58) Field of Classification Search
CPC .......... F16F 6/005; F16F 6/00; F16F 2222/06; F16F 2228/063; F16F 2232/08
See application file for complete search history.

(56) References Cited

U.S. PATENT DOCUMENTS

| 4,710,656 | A | | 12/1987 | Studer |
| 5,120,030 | A | * | 6/1992 | Lin ........................ E05C 17/30 188/267 |

(Continued)

FOREIGN PATENT DOCUMENTS

| CN | 2575367 | 9/2003 |
| CN | 1715701 | 1/2006 |

(Continued)

OTHER PUBLICATIONS

International Search Report for international application No. PCT/CN2014/080357, dated Nov. 21, 2014 (4 pages, including English translation).

(Continued)

*Primary Examiner* — Thomas Irvin
(74) *Attorney, Agent, or Firm* — Hamre, Schumann, Mueller & Larson, P.C.

(57) ABSTRACT

A single-degree-of-freedom magnetic vibration isolation device belongs to vibration isolation devices and solves the following problems: the existing active and passive combined vibration reduction system is complex in structure, needs energy supply, and has low reliability. The present invention includes a metal conductor sleeve, a base, an upper annular permanent magnet, a lower annular permanent magnet, a connecting rod and a center permanent magnet; poles of the upper annular permanent magnet and the lower annular permanent magnet facing to each other have reverse polarity, which are connected to an upper end and a lower end of an inner wall of the metal conductor sleeve respectively; the center permanent magnet is concen- (Continued)

trically sleeved on the connecting rod and fixedly connected therewith, and the center permanent magnet is located between the upper annular permanent magnet and the lower annular permanent magnet, and is capable of moving axially together with the connecting rod between the upper annular permanent magnet and the lower annular permanent magnet; and the pole of the center permanent magnet facing to the poles of the upper annular permanent magnet and the lower annular permanent magnet have reverse polarity. The present invention is simple in structure, does not need energy supply, has high reliability, and can generate a static magnetic force and a dynamic magnetic force. Connecting the device according to the present invention with a passive vibration isolation system in parallel can effectively improve the passive vibration isolation performance of the original system.

6 Claims, 2 Drawing Sheets

(56) References Cited

U.S. PATENT DOCUMENTS

| | | | | |
|---|---|---|---|---|
| 5,780,943 | A * | 7/1998 | Ono | F16F 15/035 |
| | | | | 248/638 |
| 5,844,664 | A | 12/1998 | Van Kimmenade et al. | |
| 5,979,882 | A * | 11/1999 | Osterberg | F16F 9/103 |
| | | | | 188/276 |
| 6,035,980 | A * | 3/2000 | Fujita | F16F 6/005 |
| | | | | 188/267 |
| 6,040,675 | A * | 3/2000 | Ono | B23Q 15/22 |
| | | | | 108/146 |
| 6,129,185 | A * | 10/2000 | Osterberg | F16F 6/00 |
| | | | | 188/267.2 |
| 6,402,118 | B1 * | 6/2002 | Nijsse | A47C 31/003 |
| | | | | 188/267 |
| 7,290,642 | B2 | 11/2007 | Heiland | |
| 7,628,254 | B1 | 12/2009 | Henderson et al. | |
| 2002/0074881 | A1 | 6/2002 | Imlach | |
| 2003/0222383 | A1 | 12/2003 | Heiland | |

FOREIGN PATENT DOCUMENTS

| | | | | |
|---|---|---|---|---|
| CN | 102200689 | | 9/2011 | |
| CN | 201982560 | | 9/2011 | |
| CN | 102506110 | | 6/2012 | |
| CN | 202732815 | | 2/2013 | |
| CN | 103775550 | | 5/2014 | |
| DE | 29715711 | U1 * | 11/1997 | ............ B21D 43/22 |
| FI | 102005038797 | B3 * | 10/2006 | ................ F16F 9/48 |

OTHER PUBLICATIONS

Office Action issued for Chinese patent application No. 201410051123.8, dated May 4, 2015 (11 pages, including English translation).

L. Feihong et al., "Developments and Prospects of Active Vibration Isolator for Precision Equipment," Mechanical Science and Technology for Aerospace Engineering, vol. 31, No. 9 (2012), p. 1411-1419.

* cited by examiner

SINGLE DEGREE-OF-FREEDOM MAGNETIC VIBRATION ISOLATION DEVICE

TECHNICAL FIELD

The present invention belongs to vibration isolation devices, and in particular, relates to a single-degree-of-freedom magnetic vibration isolation device which can be used to improve performance of a passive vibration isolation system.

BACKGROUND ART

With continuous development of science and technology, precise manufacturing equipment and precise measuring equipment represented by IC manufacturing equipment, high resolution electron microscopes, surface roughness testers, precise optical equipment and the like have been used more and more widely, and the precision thereof is more demanding than ever before. As important basic equipment for achieving high precision, a vibration isolation device can isolate influences of foundation and environment vibration on precise equipment, provide a "quite" working environment for vibration-sensitive equipment, and ensure normal operation of the precise equipment.

A traditional passive vibration isolation structure is generally a rigid helical spring or air spring, which, as rigid elements, cannot attenuate vibration at a natural frequency of a vibration isolation system, and in a situation where an external excitation frequency is equal to the natural frequency of the vibration isolation system, the vibration isolation system resonates, so that vibration amplitude of the load is enlarged, resulting in that the equipment cannot work normally and is even damaged. By adding a damper, enlargement of the amplitude at the natural frequency of the vibration isolation system may be reduced, but high frequency attenuation performance of the vibration isolation system will be deteriorated. Therefore, a general passive vibration isolator can give consideration to both transmissibility and high frequency transmissibility at the natural frequency only by selecting an optimal damping value. The performance of the passive vibration isolation system often cannot achieve the requirement of precise vibration isolation.

In an active and passive combined manner, the problem of insufficient passive vibration isolation performance can be solved. U.S. Pat. No. 5,844,664 (Publication Number) discloses a vibration reduction system, the vibration reduction system includes an air spring, a swing mechanism and a voice coil motor, a sensor in the vibration reduction system detects a vibration signal and sends the vibration signal to a controller, the controller calculates a control instruction and sends the control instruction to the voice coil motor, and the voice coil motor outputs a force according to the control instruction. As the output force is achieved through a control algorithm, the output force conducts attenuation only for vibration near the natural frequency, which does not affect high frequency attenuation performance. Although active vibration isolation performance of the vibration reduction system meets requirements, the vibration reduction system is complex in structure, needs energy supply, has lower reliability than the passive vibration reduction system, and is at an enormous cost.

A permanent magnet material has a wide hysteresis loop, high coercive force and high residual magnetism, is a material that can maintain constant magnetic property once magnetized, and is also referred to as a hard magnetic material. The permanent magnet material has high maximum magnetic energy product, high coercive force, high residual magnetic flux density, high residual magnetization and high stability, and is widely used in occasions of various actuators such as motors, valves, speakers, steering gears and aeronautical equipment. In a magnetic mechanism, compared with the electromagnet, the permanent magnet material has the following advantages: the permanent magnet material does not need to supply energy, is very compact in structure, is easy to maintain, has a low cost, and is easier to be accepted by users. The permanent magnet material has very high residual magnetic flux density and can produce a greater magnetic force under a small size, while the electromagnet is limited by the power of a driver, and under a great current, the electromagnet emits greater heat, and thus it is inappropriate to select the electromagnet in a magnetic mechanism where it takes a long time to output a force. Therefore, the permanent magnet material has great potential applications in precision machinery.

SUMMARY

The present invention provides a single-degree-of-freedom magnetic vibration isolation device, and solves the following problems: the existing active and passive combined vibration reduction system is complex in structure, needs energy supply, and has low reliability, which, by connecting with a traditional passive vibration isolation system in parallel, can effectively improve the performance of the passive vibration isolation system.

A first single-degree-of-freedom magnetic vibration isolation device provided in the present invention includes a base, an upper annular permanent magnet, a lower annular permanent magnet, a connecting rod and a center permanent magnet, wherein an upper surface of the base is connected with a metal conductor sleeve, the metal conductor sleeve is a hollow metal cylinder, and the base closes a lower end face of the metal conductor sleeve;

the upper annular permanent magnet and the lower annular permanent magnet are in the same shape, both of which are hollow rings; the upper annular permanent magnet and the lower annular permanent magnet are embedded into an upper annular bushing and a lower annular bushing respectively, the upper annular bushing and the lower annular bushing are connected to an upper end and a lower end of an inner wall of the metal conductor sleeve respectively, such that the upper annular permanent magnet, the lower annular permanent magnet and the metal conductor sleeve are axially concentric, and poles of the upper annular permanent magnet and the lower annular permanent magnet facing to each other have reverse polarity; and an axis of the connecting rod is coaxial with a central axis of the metal conductor sleeve, and the center permanent magnet is a hollow ring, is concentrically sleeved on the connecting rod and fixedly connected therewith; an upper end of the connecting rod passes through a center hole of the upper annular permanent magnet, and the center permanent magnet is located between the upper annular permanent magnet and the lower annular permanent magnet, and is capable of moving axially together with the connecting rod between the upper annular permanent magnet and the lower annular permanent magnet; poles of the center permanent magnet and the upper annular permanent magnet facing to each other have reverse polarity, and poles of the center permanent magnet and the lower annular permanent magnet facing to each other have reverse polarity.

According to the single-degree-of-freedom magnetic vibration isolation device, wherein the inner wall of the metal conductor sleeve has an internal thread, and an outer side face of the upper annular bushing and an outer side face of the lower annular bushing have an external thread respectively, in order that the upper annular bushing and the lower annular bushing are connected to the upper end and the lower end of the inner wall of the metal conductor sleeve 1 by thread respectively.

According to the single-degree-of-freedom magnetic vibration isolation device, wherein the base, the connecting rod, the upper annular bushing and the lower annular bushing are made of a non-magnetic conductive material; and the metal conductor sleeve is made of a metallic material with high conductivity.

A second single-degree-of-freedom magnetic vibration isolation device provided in the present invention includes a base, an upper annular permanent magnet, a lower annular permanent magnet, a connecting rod and a center permanent magnet, wherein an upper surface of the base is connected with a mounting sleeve, the mounting sleeve is a hollow cylinder, and the base closes a lower end face of the mounting sleeve;

the upper annular permanent magnet and the lower annular permanent magnet are in the same shape, both of which are hollow rings; the upper annular permanent magnet and the lower annular permanent magnet are embedded into an upper annular bushing and a lower annular bushing respectively, the upper annular bushing and the lower annular bushing are connected to an upper end and a lower end of an inner wall of the mounting sleeve respectively, such that the upper annular permanent magnet, the lower annular permanent magnet and the mounting sleeve are axially concentric, and poles of the upper annular permanent magnet and the lower annular permanent magnet facing to each other have reverse polarity;

an upper conductor plate and a lower conductor plate are in the same shape, both of which are circular plates having central threaded holes, and an outer diameter of each of the circular plates is less than an inner diameter of the mounting sleeve, in order to slide in an inner hole of the mounting sleeve;

an axis of the connecting rod is coaxial with a central axis of the mounting sleeve, and the center permanent magnet is a hollow ring, is concentrically sleeved on a rod body of the connecting rod and fixedly connected therewith; an upper end and a lower end of the connecting rod pass through center holes of the upper annular permanent magnet and the lower annular permanent magnet respectively, and the upper end of the connecting rod passing through the center hole of the upper annular permanent magnet has an external thread and is connected with the central threaded hole of the upper conductor plate by thread; the lower end of the connecting rod passing through the center hole of the lower annular permanent magnet has an external thread and is connected with the central threaded hole of the lower conductor plate by thread; and the center permanent magnet is located between the upper annular permanent magnet and the lower annular permanent magnet, and is capable of moving axially together with the connecting rod between the upper annular permanent magnet and the lower annular permanent magnet; poles of the center permanent magnet and the upper annular permanent magnet facing to each other have reverse polarity, and poles of the center permanent magnet and the lower annular permanent magnet facing to each other have reverse polarity.

According to the single-degree-of-freedom magnetic vibration isolation device, wherein the inner wall of the mounting sleeve has an internal thread, and an outer side face of the upper annular bushing and an outer side face of the lower annular bushing have an external thread respectively, in order that the upper annular bushing and the lower annular bushing are connected to the upper end and the lower end of the inner wall of the mounting sleeve by thread respectively.

According to the single-degree-of-freedom magnetic vibration isolation device, wherein the base, the connecting rod, the upper annular bushing and the lower annular bushing are made of a non-magnetic conductive material; the mounting sleeve is made of a non-metallic material; and the upper conductor plate and the lower conductor plate are made of a metallic material with high conductivity.

The present invention is simple in structure, does not need energy supply, has high reliability, and can generate a static magnetic force and a dynamic magnetic force, the static magnetic force is achieved through attraction of like poles of permanent magnets, and the dynamic magnetic force is achieved through producing eddy-current damping by relative movement of the metal conductor sleeve and the permanent magnets; as the size of the static magnetic force is only related to displacement, when the device of the present invention is stationary, a magnetic force is also present, which can be seen as a stiffness force, the eddy-current damping is only related to the velocity of the relative movement and is only present when the magnetic mechanism moves, which can be seen as a viscous damping force. The present invention is connected in parallel with a passive vibration isolation system such as a rigid helical spring or an air spring, which reduces enlargement of amplitude at a natural frequency while not affecting high frequency attenuation performance of the vibration isolation system and can effectively improve passive vibration isolation performance of the original system.

DETAILED DESCRIPTION

The present invention is further described below with reference to the accompanying drawings and embodiments.

Figure 1:
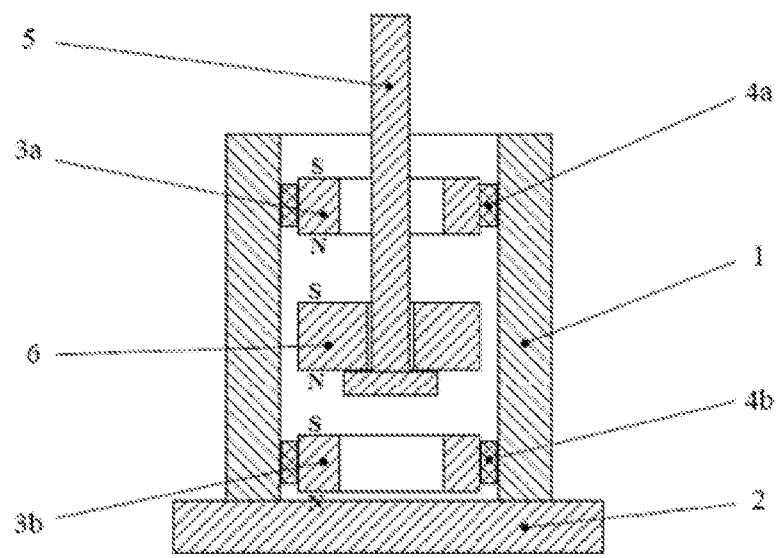
FIG. 1 is a schematic structural diagram of a first embodiment of the present invention.

As shown in FIG. 1, in a first embodiment of the present invention, a metal conductor sleeve 1, a base 2, an upper annular permanent magnet 3a, a lower annular permanent magnet 3b, a connecting rod 5 and a center permanent magnet 6 are included;

an upper surface of the base 2 is connected with a metal conductor sleeve 1, the metal conductor sleeve 1 is a hollow metal cylinder, and the base 2 closes a lower end face of the metal conductor sleeve 1;

the upper annular permanent magnet 3a and the lower annular permanent magnet 3b are in the same shape, both of which are hollow rings; the upper annular permanent magnet 3a and the lower annular permanent magnet 3b are embedded into an upper annular bushing 4a and a lower annular bushing 4b respectively, the upper annular bushing 4a and the lower annular bushing 4b are connected to an upper end and a lower end of an inner wall of the metal conductor sleeve 1 respectively, such that the upper annular permanent magnet 3a, the lower annular permanent magnet 3b and the metal conductor sleeve 1 are axially concentric, and poles of the upper annular permanent magnet 3a and the lower annular permanent magnet 3b facing to each other have reverse polarity, which are an N pole and an S pole respectively;

an axis of the connecting rod 5 is coaxial with a central axis of the metal conductor sleeve 1, and the center permanent magnet 6 is a hollow ring, is concentrically sleeved on the connecting rod 5 and fixedly connected therewith; an upper end of the connecting rod 5 passes through a center hole of the upper annular permanent magnet 3a, and the center permanent magnet 6 is located between the upper annular permanent magnet 3a and the lower annular permanent magnet 3b, and is capable of moving axially together with the connecting rod 5 between the upper annular permanent magnet 3a and the lower annular permanent magnet 3b; poles of the center permanent magnet 6 and the upper annular permanent magnet 3a facing to each other have reverse polarity, which are an S pole and an N pole respectively; and poles of the center permanent magnet 6 and the lower annular permanent magnet 3b facing to each other have reverse polarity, which are an N pole and an S pole respectively.

In order not to affect magnetic field distribution of the permanent magnets, the base 2, the connecting rod 5, the upper annular bushing 4a and the lower annular bushing 4b are made of a polymer composite material such as polyurethane or organic glass; the metal conductor sleeve 1 is made of metal copper with high conductivity.

The center permanent magnet 6 is attracted by magnetic forces of the upper annular permanent magnet 3a and the lower annular permanent magnet 3b at the same time. When the center permanent magnet 6 is just located at the very center of the upper annular permanent magnet 3a and the lower annular permanent magnet 3b, upper and lower magnetic attractive forces are of the same size, but in opposite directions, and at this point, the center permanent magnet 6 is under force balance. When the center permanent magnet 6 deviates to the upper annular permanent magnet 3a or the lower annular permanent magnet 3b on one side, the upper annular permanent magnet 3a or the lower annular permanent magnet 3b on the side will attract the center permanent magnet 6 thereto. Such a static magnetic force related to displacement can be seen as negative stiffness. When the center permanent magnet 6 and the metal conductor sleeve 1 make relative movement, an eddy current will be produced in the metal conductor sleeve 1, the eddy current is subject to the Ampere force of a magnetic field excited by the center permanent magnet 6, such a dynamic magnetic force related to velocity can be seen as viscous damping, and the damping force is opposite to the direction of the relative movement all the time.

Figure 2:
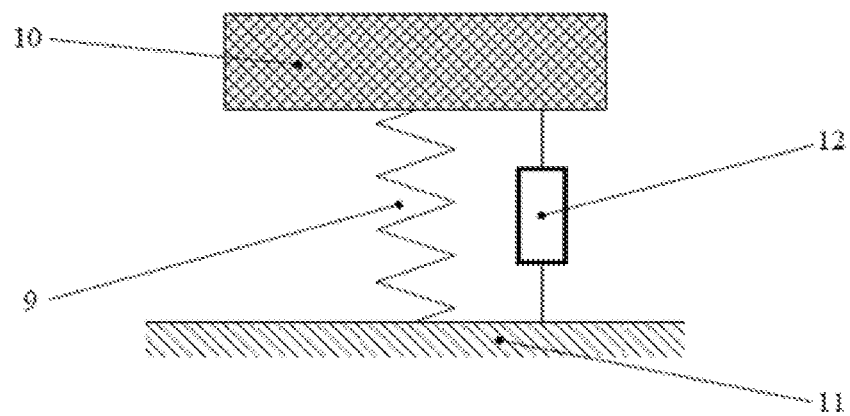
FIG. 2 is an application principle diagram of the first embodiment.

FIG. 2 is an application principle diagram of the first embodiment. A load 10 is supported by a passive spring element 9, used to isolate transfer of vibration of a foundation 11 onto the load 10. The single-degree-of-freedom magnetic vibration isolation device 12 in the first embodiment is connected with the passive spring element 9 in parallel, wherein the connecting rod 5 in the first embodiment is connected with the load 10, and the base 2 is connected with the foundation 11. In order not to affect static deformation of the passive vibration isolation system, when the single-degree-of-freedom magnetic vibration isolation device 12 is connected with the passive spring element 9 in parallel, the center permanent magnet 6 is just located in a middle position of the upper annular permanent magnet 3a and the lower annular permanent magnet 3b, and at this point, the center permanent magnet 6 is under a force of zero, which may not change a balance position of the passive vibration isolation system. When the load 10 is located above the balance position, the passive spring element 9 is in a tensile state and produces a downward spring force; at this point, in the single-degree-of-freedom magnetic vibration isolation device 12 of the present invention, the center permanent magnet 6 may be close to the upper annular permanent magnet 3a, and move up under a resultant force of the upper annular permanent magnet 3a and the lower annular permanent magnet 3b, which cancels a part of the downward spring force produced by the passive spring element 9. When the load 10 is located below the balance position, the passive spring element 9 is in a compressed state and produces an upward spring force; at this point, in the single-degree-of-freedom magnetic vibration isolation device 12 of the present invention, the center permanent magnet 6 may be close to the lower annular permanent magnet 3b, and move down under a resultant force of the upper annular permanent magnet 3a and the lower annular permanent magnet 3b, which cancels a part of the upward spring force produced by the passive spring element 9. On the whole, the spring force applied to the load 10 is reduced, that is, the stiffness of the vibration isolation system becomes smaller.

Figure 3:
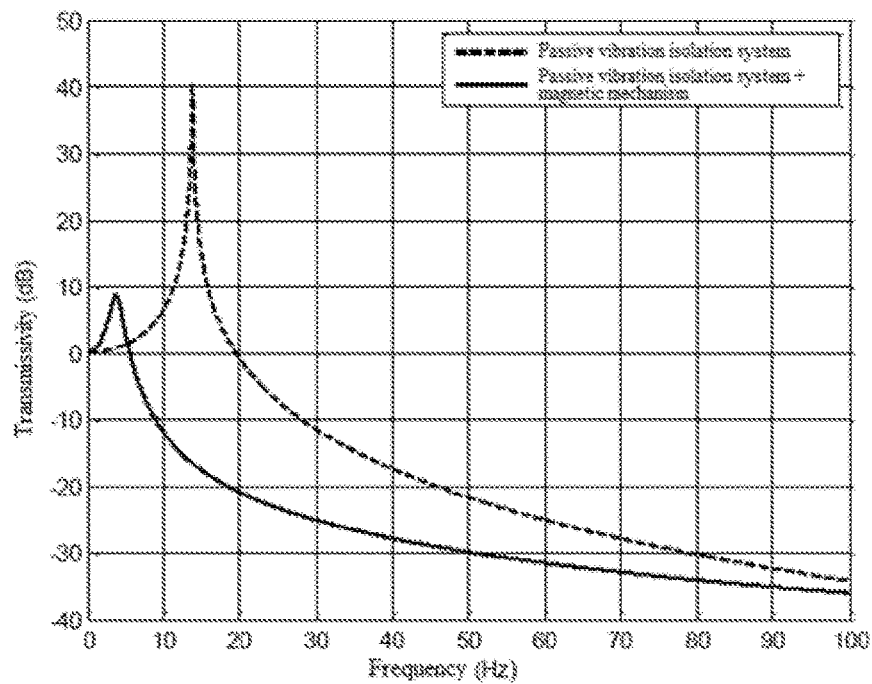
FIG. 3 is a schematic effect diagram of the system shown in FIG. 2.

FIG. 3 is a schematic effect diagram of the system shown in FIG. 2. The vertical axis in FIG. 3 is the transmissibility of the system, and the horizontal axis is the frequency. The traditional passive vibration isolation system can effectively isolate vibration of the foundation in a high frequency band, but greater enlargement of amplitude is present at a natural frequency. It can be seen by connecting the passive vibration isolation system with the device in the first embodiment in parallel that the transmissibility at the natural frequency is greatly reduced, and the high frequency performance is not deteriorated. In an actual application of the present invention, it is necessary to design a parameter in the present invention according to an actual vibration isolation system to match it, the static magnetic force is determined by magnetic field strengths and dimensions of the upper annular permanent magnet 3a, the lower annular permanent magnet 3b and the center permanent magnet 6, the size of the static magnetic force mainly affects a peak frequency of the system, and a too large static magnetic force may make the peak frequency of the system too small and even close to 0 Hz, making the system lose stability. The dynamic magnetic force is determined by the magnetic field strength and dimension of the center permanent magnet 6 and the dimension and electrical conductivity of the metal conductor sleeve 1, which mainly affects the size of amplitude of the system peak value, the greater the dynamic magnetic force is, the smaller the amplitude of the system peak value is, and a user needs to design the size of the dynamic magnetic force according to the requirement for a resonance peak value.

Structural composition of a second embodiment of the present invention is the same as that of the first embodiment; as shown in FIG. 1, the difference is merely as follows: an inner wall of the metal conductor sleeve 1 has an internal thread, and an outer side face of the upper annular bushing 4a and an outer side face of the lower annular bushing 4b have an external thread respectively, in order that the upper annular bushing 4a and the lower annular bushing 4b are connected to the upper end and the lower end of the inner wall of the metal conductor sleeve 1 by thread respectively.

The smaller a distance between the upper annular permanent magnet 3a and the lower annular permanent magnet 3b is, the stronger the static magnetic force applied to the center permanent magnet 6 is, and the greater the value of the negative stiffness thereof is. On the contrary, the greater the distance between the upper annular permanent magnet 3a and the lower annular permanent magnet 3b is, the weaker the static magnetic force applied to the center permanent magnet 6 is, and the smaller the value of the negative stiffness thereof is. Compared with the first embodiment, the second embodiment has an advantage of changing a cooperate position of the upper annular bushing 4a and the lower annular bushing 4b on the upper end and the lower end of the inner wall of the metal conductor sleeve 1, so as to adjust the distance between the upper annular permanent magnet 3a and the lower annular permanent magnet 3b and change the value of the negative stiffness, which avoids that the system loses stability because the value of the negative stiffness is over the value of the positive stiffness of the passive vibration isolation system.

Figure 4:
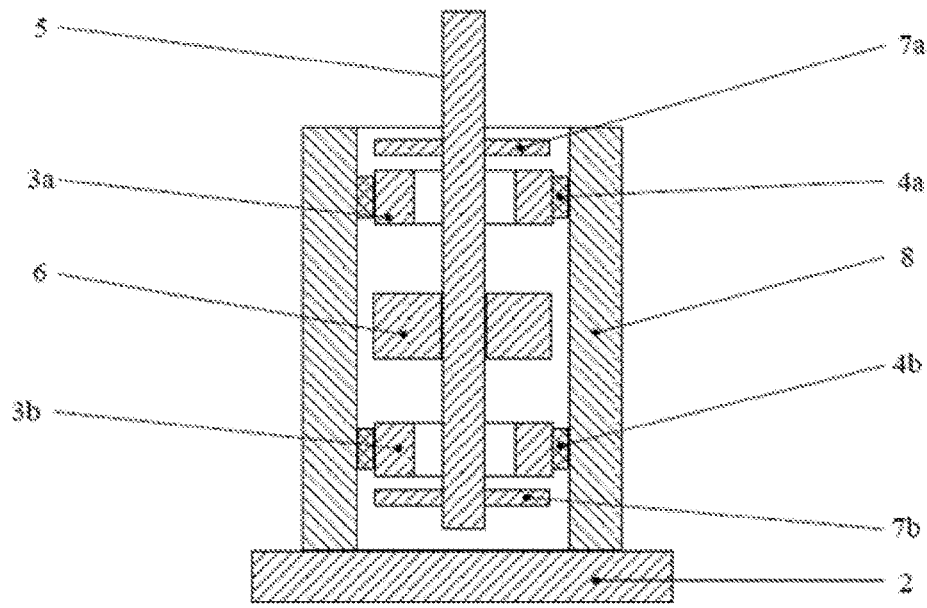
FIG. 4 is a schematic structural diagram of a third embodiment of the present invention.

As shown in FIG. 4, in a third embodiment of the present invention, a base 2, an upper annular permanent magnet 3a, a lower annular permanent magnet 3b, a connecting rod 5 and a center permanent magnet 6 are included;

an upper surface of the base 2 is connected with a mounting sleeve 8, the mounting sleeve 8 is a hollow cylinder, and the base 2 closes a lower end face of the mounting sleeve 8;

the upper annular permanent magnet 3a and the lower annular permanent magnet 3b are in the same shape, both of which are hollow rings; the upper annular permanent magnet 3a and the lower annular permanent magnet 3b are embedded into an upper annular bushing 4a and a lower annular bushing 4b respectively, the upper annular bushing 4a and the lower annular bushing 4b are connected to an upper end and a lower end of an inner wall of the mounting sleeve 8 respectively, such that the upper annular permanent magnet 3a, the lower annular permanent magnet 3b and the mounting sleeve 8 are axially concentric, and poles of the upper annular permanent magnet 3a and the lower annular permanent magnet 3b facing to each other have reverse polarity;

the inner wall of the mounting sleeve 8 has an internal thread, and an outer side face of the upper annular bushing 4a and an outer side face of the lower annular bushing 4b have an external thread respectively, in order that the upper annular bushing 4a and the lower annular bushing 4b are connected to the upper end and the lower end of the inner wall of the mounting sleeve 8 by thread respectively;

an upper conductor plate 7a and a lower conductor plate 7b are in the same shape, both of which are circular plates having central threaded holes, and an outer diameter of each of the circular plates is less than an inner diameter of the mounting sleeve 8, in order to slide in an inner hole of the mounting sleeve 8;

an axis of the connecting rod 5 is coaxial with a central axis of the mounting sleeve 8, and the center permanent magnet 6 is a hollow ring, is concentrically sleeved on a rod body of the connecting rod 5 and fixedly connected therewith; an upper end and a lower end of the connecting rod 5 pass through center holes of the upper annular permanent magnet 3a and the lower annular permanent magnet 3b respectively, and the upper end of the connecting rod 5 passing through the center hole of the upper annular permanent magnet 3a has an external thread and is connected with the central threaded hole of the upper conductor plate 7a by thread; the lower end of the connecting rod 5 passing through the center hole of the lower annular permanent magnet 3b has an external thread and is connected with the central threaded hole of the lower conductor plate 7b by thread; and the center permanent magnet 6 is located between the upper annular permanent magnet 3a and the lower annular permanent magnet 3b, and is capable of moving axially together with the connecting rod 5 between the upper annular permanent magnet 3a and the lower annular permanent magnet 3b; poles of the center permanent magnet 6 and the upper annular permanent magnet 3a facing to each other have reverse polarity, and poles of the center permanent magnet 6 and the lower annular permanent magnet 3b facing to each other have reverse polarity.

In order not to affect magnetic field distribution of the permanent magnets, the base 2, the connecting rod 5, the upper annular bushing 4a and the lower annular bushing 4b are made of a polymer composite material such as polyurethane or organic glass; in order not to affect the size of eddy-current damping, the mounting sleeve 8 is made of a polymer composite material such as polyurethane or organic glass; and the upper conductor plate 7a and the lower conductor plate 7b are made of metal copper with high conductivity.

Compared with the first embodiment and the second embodiment, the third embodiment has the following advantages:

The relative movement between the center permanent magnet and the metal conductor sleeve is changed into relative movement between the upper annular permanent magnet 3a, the lower annular permanent magnet 3b and the upper conductor plate 7a, the lower conductor plate 7b. The movement of the center permanent magnet 6 drives movement of the upper conductor plate 7a and the lower conductor plate 7b, causing the upper conductor plate 7a, the lower conductor plate 7b and the upper annular permanent magnet 3a, the lower annular permanent magnet 3b to make relative movement to produce eddy-current damping.

It is possible to change the distances between the upper conductor plate 7a, the lower conductor plate 7b and the upper annular permanent magnet 3a, the lower annular permanent magnet 3b on the connecting rod 5, and it is possible to adjust the size of the dynamic magnetic force according to different application occasions, which increases applicability of the magnetic mechanism.

The invention claimed is:

1. A single-degree-of-freedom magnetic vibration isolation device, comprising a base, an upper annular permanent magnet, a lower annular permanent magnet, a connecting rod and a center permanent magnet, wherein an upper surface of the base is connected with a metal conductor sleeve, the metal conductor sleeve is a hollow metal cylinder, and the base closes a lower end face of the metal conductor sleeve;

the upper annular permanent magnet and the lower annular permanent magnet are in the same shape, both of which are hollow rings; the upper annular permanent magnet and the lower annular permanent magnet are embedded into an upper annular bushing and a lower annular bushing respectively, the upper annular bushing and the lower annular bushing are connected to an upper end and a lower end of an inner wall of the metal conductor sleeve respectively, such that the upper annular permanent magnet, the lower annular permanent magnet and the metal conductor sleeve are axially concentric, and poles of the upper annular permanent magnet and the lower annular permanent magnet facing to each other have reverse polarity; and an axis of the connecting rod is coaxial with a central axis of the metal conductor sleeve, and the center permanent magnet is a hollow ring, is concentrically sleeved on the connecting rod and fixedly connected therewith; an upper end of the connecting rod passes through a center hole of the upper annular permanent magnet, and the center permanent magnet is located between the upper annular permanent magnet and the lower annular permanent magnet, and is capable of moving axially together with the connecting rod between the upper annular permanent magnet and the lower annular permanent magnet; poles of the center permanent magnet and the upper annular permanent magnet facing to each other have reverse polarity, and poles of the center permanent magnet and the lower annular permanent magnet facing to each other have reverse polarity.

2. The single-degree-of-freedom magnetic vibration isolation device according to claim 1, wherein
the inner wall of the metal conductor sleeve has an internal thread, and an outer side face of the upper annular bushing and an outer side face of the lower annular bushing have an external thread respectively, in order that the upper annular bushing and the lower annular bushing are connected to the upper end and the lower end of the inner wall of the metal conductor sleeve by thread respectively.

3. The single-degree-of-freedom magnetic vibration isolation device according to claim 1, wherein
the base, the connecting rod, the upper annular bushing and the lower annular bushing are made of a non-magnetic conductive material; and the metal conductor sleeve is made of a metallic material with high conductivity.

4. A single-degree-of-freedom magnetic vibration isolation device, comprising a base, an upper annular permanent magnet, a lower annular permanent magnet, a connecting rod and a center permanent magnet, wherein
an upper surface of the base is connected with a mounting sleeve, the mounting sleeve is a hollow cylinder, and the base closes a lower end face of the mounting sleeve;
the upper annular permanent magnet and the lower annular permanent magnet are in the same shape, both of which are hollow rings; the upper annular permanent magnet and the lower annular permanent magnet are embedded into an upper annular bushing and a lower annular bushing respectively, the upper annular bushing and the lower annular bushing are connected to an upper end and a lower end of an inner wall of the mounting sleeve respectively, such that the upper annular permanent magnet, the lower annular permanent magnet and the mounting sleeve are axially concentric, and poles of the upper annular permanent magnet and the lower annular permanent magnet facing to each other have reverse polarity;

an upper conductor plate and a lower conductor plate are in the same shape, both of which are circular plates having central threaded holes, and an outer diameter of each of the circular plates is less than an inner diameter of the mounting sleeve, in order to slide in an inner hole of the mounting sleeve;

an axis of the connecting rod is coaxial with a central axis of the mounting sleeve, and the center permanent magnet is a hollow ring, is concentrically sleeved on a rod body of the connecting rod and fixedly connected therewith; an upper end and a lower end of the connecting rod pass through center holes of the upper annular permanent magnet and the lower annular permanent magnet respectively, and the upper end of the connecting rod passing through the center hole of the upper annular permanent magnet has an external thread and is connected with the central threaded hole of the upper conductor plate by thread; the lower end of the connecting rod passing through the center hole of the lower annular permanent magnet has an external thread and is connected with the central threaded hole of the lower conductor plate by thread; and the center permanent magnet is located between the upper annular permanent magnet and the lower annular permanent magnet, and is capable of moving axially together with the connecting rod between the upper annular permanent magnet and the lower annular permanent magnet; poles of the center permanent magnet and the upper annular permanent magnet facing to each other have reverse polarity, and poles of the center permanent magnet and the lower annular permanent magnet facing to each other have reverse polarity.

5. The single-degree-of-freedom magnetic vibration isolation device according to claim 4, wherein
the inner wall of the mounting sleeve has an internal thread, and an outer side face of the upper annular bushing and an outer side face of the lower annular bushing have an external thread respectively, in order that the upper annular bushing and the lower annular bushing are connected to the upper end and the lower end of the inner wall of the mounting sleeve by thread respectively.

6. The single-degree-of-freedom magnetic vibration isolation device according to claim 4, wherein
the base, the connecting rod, the upper annular bushing and the lower annular bushing are made of a non-magnetic conductive material; the mounting sleeve is made of a non-metallic material; and the upper conductor plate and the lower conductor plate are made of a metallic material with high conductivity.

\* \* \* \* \*